United States Patent
MacArthur et al.

(10) Patent No.: US 9,469,263 B2
(45) Date of Patent: Oct. 18, 2016

(54) SYSTEMS AND METHODS FOR FILLING A VEHICLE COMPONENT WITH FLUID

(71) Applicant: HONDA MOTOR CO., LTD., Tokyo (JP)

(72) Inventors: Benjamin MacArthur, Ontario (CA); David Robert Winning, Ontario (CA)

(73) Assignee: Honda Motor Co., Ltd., Tokyo (JP)

( * ) Notice: Subject to any disclaimer, the term of this patent is extended or adjusted under 35 U.S.C. 154(b) by 142 days.

(21) Appl. No.: 14/453,098

(22) Filed: Aug. 6, 2014

(65) Prior Publication Data

US 2016/0039548 A1      Feb. 11, 2016

(51) Int. Cl.
*B60R 17/00* (2006.01)
*B67D 7/42* (2010.01)

(52) U.S. Cl.
CPC ............. *B60R 17/00* (2013.01); *B67D 7/42* (2013.01)

(58) Field of Classification Search
CPC ............ B67D 7/00; B67D 7/02; B67D 7/04; B67D 2007/0444; B67D 2007/0455; B67D 2007/0474
USPC .................. 141/2, 59, 94, 95, 285, 351, 392
See application file for complete search history.

(56) References Cited

U.S. PATENT DOCUMENTS

| | | | |
|---|---|---|---|
| 4,877,066 A | 10/1989 | Okamizu | |
| 5,249,612 A * | 10/1993 | Parks | B67D 7/348 141/219 |
| 5,316,057 A * | 5/1994 | Hasselmann | B67D 7/0496 141/392 |
| 5,485,857 A | 1/1996 | Amundsen | |
| 5,655,577 A * | 8/1997 | Loen | B67D 7/048 141/198 |
| 5,743,357 A | 4/1998 | Few | |
| 6,026,866 A * | 2/2000 | Nanaji | B67D 7/0476 141/206 |
| 6,065,507 A * | 5/2000 | Nanaji | B67D 7/54 141/286 |
| 6,244,384 B1 | 6/2001 | Few | |
| 6,378,657 B2 | 4/2002 | Viken | |
| 6,705,173 B1 | 3/2004 | Elberson | |
| 6,799,614 B1 * | 10/2004 | Smith | B67D 7/42 141/287 |
| 6,957,674 B2 * | 10/2005 | Burr | B67D 7/54 141/386 |
| 7,207,418 B2 | 4/2007 | Richardson et al. | |
| 7,806,295 B2 | 10/2010 | Stradella et al. | |
| 8,844,587 B1 * | 9/2014 | McCommons | B67D 7/42 141/207 |
| 2012/0180651 A1 | 7/2012 | Wanie | |
| 2013/0108521 A1 | 5/2013 | Ikushima | |
| 2013/0287593 A1 | 10/2013 | Erwin et al. | |

FOREIGN PATENT DOCUMENTS

WO       WO 0140105 A1 *  6/2001 ............. B60K 15/04

* cited by examiner

*Primary Examiner* — Timothy L Maust
(74) *Attorney, Agent, or Firm* — Armstrong Teasdale LLP

(57) ABSTRACT

A fluid fill system includes a fill nozzle having a head configured to be received in a reservoir of a vehicle component for filling the reservoir with a fluid and a fluid fill sensor system having an air hose coupled to the head. The fluid fill sensor system has a pressure sensor pneumatically sensing when the fill nozzle is properly seated with the vehicle component by sensing an increase in a pressure of the fluid fill sensor system.

22 Claims, 2 Drawing Sheets

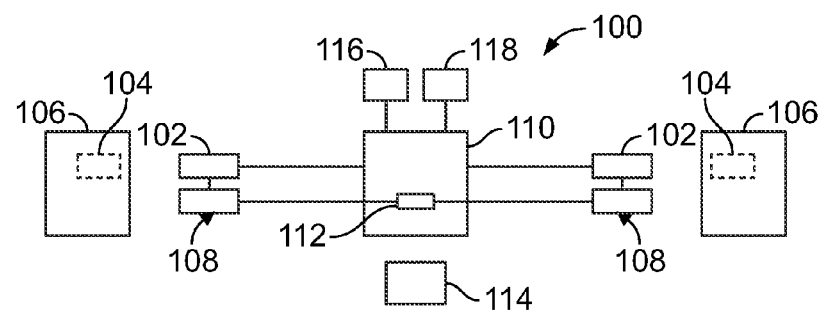
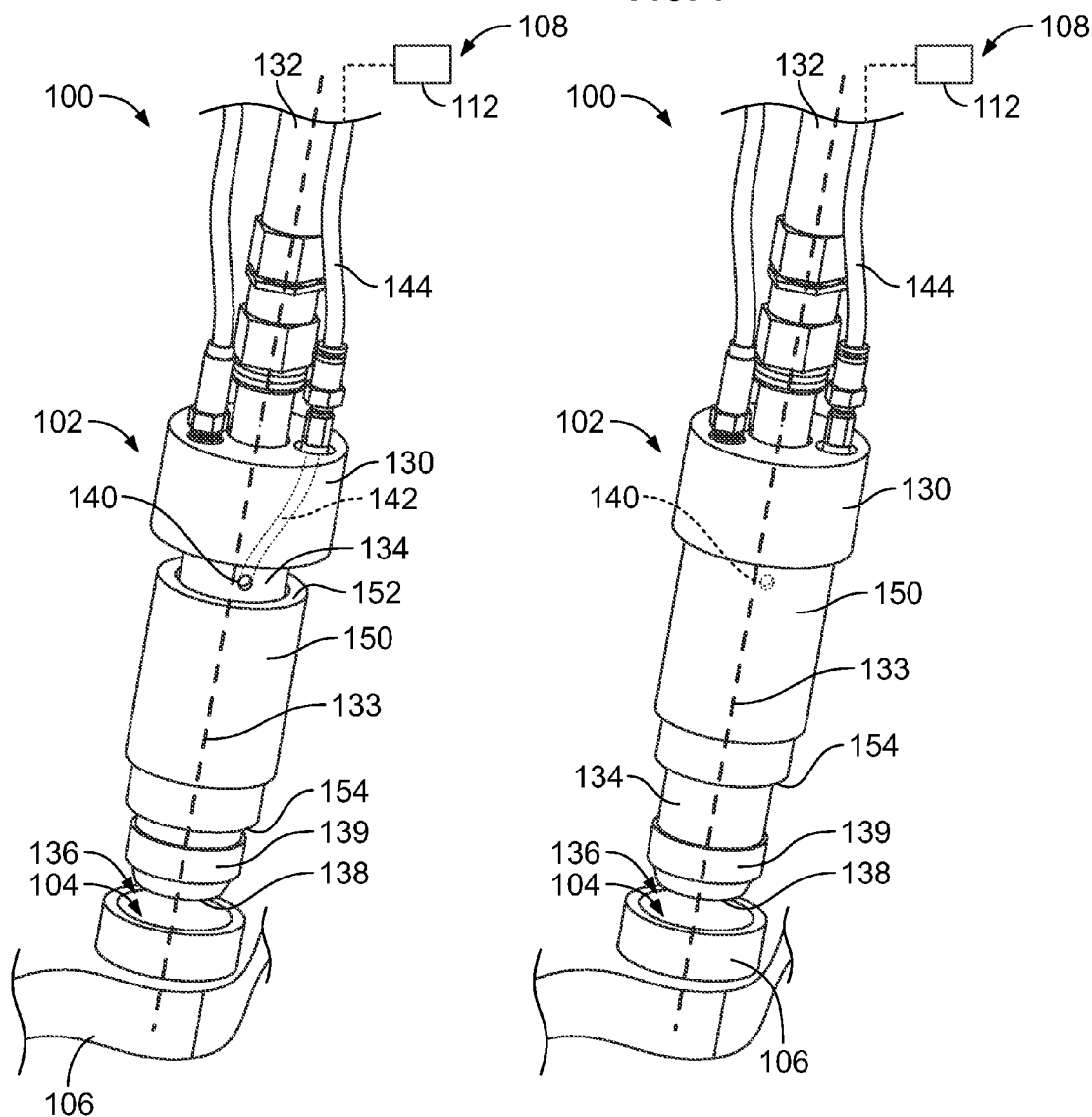
FIG. 1
FIG. 2
FIG. 3

SYSTEMS AND METHODS FOR FILLING A VEHICLE COMPONENT WITH FLUID

BACKGROUND

The present disclosure relates generally to systems and methods for filling a vehicle component with fluid.

Vehicle components, such as transmissions, require pre-filling of fluids during the assembly process. For example, transmissions require a predetermined quantity of transmission fluid to ensure proper operation. Various fluid fill systems are in use for filling transmissions with fluid. For example, a hand-held fill nozzle is provided along the assembly line, which is operated to fill a predetermined amount of fluid in the transmission. Different types of transmissions require a different amount of fluid. Other components of the vehicle are also filled with other types of fluid, such as oil, washer fluid, and the like, during assembly. Some known systems pneumatically fill the vehicle components with pressurized fluid. However, known fluid fill systems are not without disadvantages. For instance, the fluid fill system may be operated to dispense the fluid based on demand of the operator, for example when the operator presses a button or lever to dispense the fluid. However, when the fill nozzle is not properly seated in the vehicle component, the fluid may spill. If spillage occurs there is no way to know how much fluid spilled and therefore how much fluid needs to be dispensed into the vehicle component.

A need remains for a fluid fill systems that provides a cost effective and reliable way to indicate to an operator that the fill nozzle is properly situated in the vehicle component and/or only fill when properly seated in the vehicle component.

BRIEF DESCRIPTION

In one embodiment, a fluid fill system is provided including a fill nozzle having a head configured to be received in a reservoir of a vehicle component for filling the reservoir with a fluid and a fluid fill sensor system having an air hose coupled to the head. The fluid fill sensor system has a pressure sensor pneumatically sensing when the fill nozzle is properly seated with the vehicle component by sensing an increase in a pressure of the fluid fill sensor system.

In another embodiment, a fluid fill system is provided including a fill nozzle having a head configured to be received in a reservoir of a vehicle component. The head is positionable in a seated position in the vehicle component in which fluid is capable of being dispensed into the reservoir. The head is positionable in an unseated position relative to the vehicle component in which fluid is unable to be dispensed into the reservoir. The head has an aperture positioned exterior of the vehicle component. A fluid fill sensor system is configured to sense when the head is in the seated position and when the head is in the unseated position. The fluid fill sensor system has an air hose coupled to the head and in fluid communication with the aperture. A collar is movably coupled to the fill nozzle. The collar is movable between a blocking position and an unblocking position. In the blocking position, the collar is aligned with the aperture and blocks airflow through the aperture. In the unblocking position, the collar is not aligned with the aperture and air is able to flow through the aperture. The collar is moved to the blocking position when the fill nozzle is in the seated position. The collar is moved to the unblocking position when the fill nozzle is in the unseated position.

In a further embodiment, a method of filling fluid in a vehicle component is provided that includes coupling a fluid fill sensor system to a fill nozzle, determining a baseline pressure of the fluid fill sensor system, determining an operational pressure of the fluid fill sensor system, and beginning a filling operation after the operational pressure increases from the baseline pressure.

BRIEF DESCRIPTION OF THE DRAWINGS

FIG. 1 is a block diagram showing a fluid fill system in accordance with one embodiment.

FIG. 2 is a perspective view of a fill nozzle and a portion of a fluid fill sensor system of the fluid fill system of FIG. 1 and formed in accordance with an exemplary embodiment.

FIG. 3 is a perspective view of the fill nozzle and fluid fill sensor system shown in FIG. 2 showing the fill nozzle in a blocking position.

DETAILED DESCRIPTION

Figure 4:
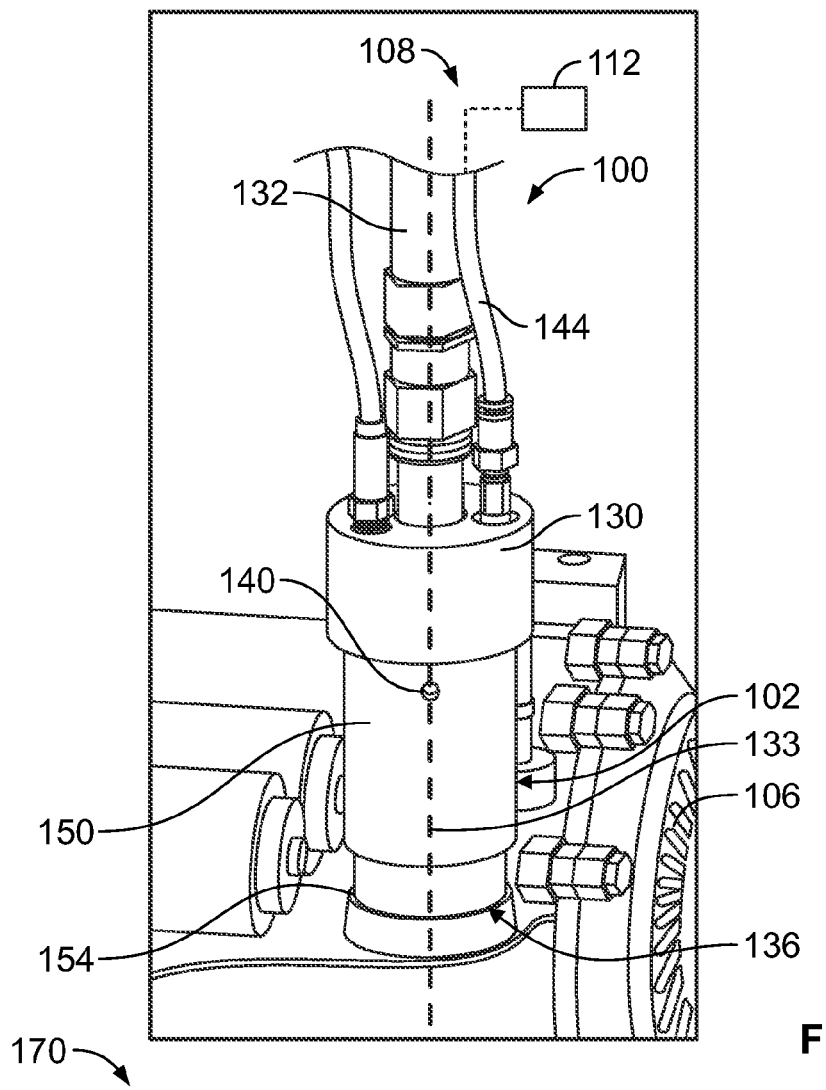
FIG. 4 is a perspective view of the fill nozzle and fluid fill sensor system shown in FIGS. 2 and 3 showing the fill nozzle in a seated position.

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., systems, devices, processors, controllers, or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "module", "system," or "unit," may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules, units, or systems shown in the attached figures may represent the hardware that operates based on software or hardwired instructions, the software that directs hardware to perform the operations, or a combination thereof.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments of methods and systems for filling a vehicle component with fluid are provided. It should be noted that although the various embodiments are described in connection with the automotive industry, such as for an automobile assembly process, one or more embodiments may be implemented in different industries and for different applications.

One or more embodiments include a fill nozzle having a head configured to be received in a reservoir of a vehicle component for filling the reservoir with a fluid and a fluid fill sensor system having an air hose coupled to the head. The fluid fill sensor system has a pressure sensor pneumatically sensing when the fill nozzle is properly seated with the vehicle component by sensing an increase in a pressure of the fluid fill sensor system. Control of the filling operation may be based on an output from the fluid fill sensor system.

FIG. 1 is a block diagram showing a vehicle component fluid fill system 100 in accordance with one embodiment. The vehicle component fluid fill system 100 includes a fill nozzle 102 implemented for filling fluid in a vehicle component reservoir 104 of a vehicle component 106. For example, the fluid fill system 100 may be used to fill transmission fluid in a transmission of a vehicle and embodiments described herein may specifically reference a transmission 106, transmission fluid, and the like; however the fluid fill system 100 is not limited to transmission embodiments and other types of fluid may be filled in other vehicle components in other embodiments, such as oil in an oil reservoir of an engine, washer fluid in a washer fluid reservoir, hydraulic fluid in a hydraulic system of a vehicle, and the like. The reservoir 104 may be any type of tank or container used to hold the fluid of the vehicle component 106. The reservoir 104 may be a separate receptacle connected to the vehicle component by a hose or fluid supply line or alternatively, may be housed or contained within the vehicle component 106. The reservoir 104 includes the receptacle itself as well as any fill tube or line leading to the receptacle.

The fluid fill system 100 includes a fluid fill sensor system 108 implemented for sensing proper seating of the fill nozzle 102 with the vehicle component 106. In the illustrated embodiment, the fluid fill system 100 includes a control module 110 that monitors the fluid fill sensor system 108 and controls filling of the fluid through the fill nozzle 102.

It should be noted that the fluid fill sensor system 108, the control module 110 and the fill nozzle may be separate components or integrated into a single component or assembly. It also should be noted that additional elements may be provided, such as multiple fill nozzles 102 and fluid fill sensor systems 108 associated with such fill nozzles 102. The fill nozzles 102 may have different shapes for filling different types of transmissions, such as transmissions for different vehicles and/or different types of transmissions 106 (e.g., manual transmissions, automatic transmissions, and the like).

The control module 110 operates to monitor and control one or more operating characteristics or parameters of the fill nozzle 102, such as the ON/OFF state of the fill nozzle 102, whether or not the fill nozzle 102 is in a seated or an unseated position relative to the vehicle component 106, and the like. In an exemplary embodiment, the control module 110 receives operational data acquired from a sensor 112 of the fluid fill sensor system 108. Thus, in the illustrated embodiment, the operational data is data relating to the fill nozzle 102 being properly positioned or seated relative to the vehicle component 106. In an exemplary embodiment, the fluid fill sensor system 108 is a pneumatic system and the sensor 112 is a pressure sensor that monitors a pressure of the fluid fill sensor system 108. Using a pneumatic system eliminates the need for electronics at the fill nozzle, which may be damaged by the fluid dispensed from the fill nozzle, such as when a spill occurs. However, other types of systems other than pneumatic systems may be used in alternative embodiments to monitor and sense when the fill nozzle 102 is properly seated to allow the filling operation to occur. The sensor 112 may be included as a component of the control module 110. Alternatively, the sensor 112 may be located remote from the control module 110, such as at or near the fill nozzle 102. In such embodiments, the sensor 112 may communicate via a wired connection or via a wireless connection with the control module 110.

In some embodiments, the fluid fill system 100 includes a memory subsystem 114 coupled to the control module 110 to store the received data. It should be noted that the memory subsystem 114 may store other data, such as pressure reference values that correspond to operating characteristics of the fill nozzle 102. The memory subsystem 114 may include a look-up table, such as to compare the received data to one or more defined (e.g., user programmed) reference values, such as upper and lower reference values.

The fluid fill system 100 includes a user input 116 (e.g., keyboard or touchscreen) coupled to the control module 110 to receive one or more user inputs. In various embodiments, the user inputs 116 may include, for example, a keyboard, mouse, or trackball, among others. However, it should be appreciated that that other user inputs 116, such as other external user input devices or peripheral devices as known in the art may be used. A user is able to interface or interact with the control module 110 using the one or more user input 116 (e.g., select or input data).

The fluid fill system 100 includes a display 118 coupled to the control module 110 to present data to a user. In various embodiments, the display 118 (e.g., a monitor) may be provided to display information of data. For example, the display 118 may be used to present a visual representation of an output, such as monitored pressure values and threshold values. The display 118 may include one or more display devices and may be combined with the control module 110, the fluid fill sensor system 108, and the like, such as in a common housing, or such display devices may be separate or external peripheral display devices.

The control module 110 may form part of or be embodied as one or more computing systems, such as one or more PLCs. It should be noted that while a particular computing or operating environment may be described herein, the computing or operating environment is intended to illustrate operations or processes that may be, implemented, performed, and/or applied to a variety of different computing or operating environments. Thus, FIG. 1 illustrates a non-limiting example of a controller or computing system that may perform one or more methods or processes as described in more detail herein.

The control module 110 may be provided, for example, as any type of computing device, including, but not limited to PLCs or personal computing systems, among others. The control module 110 may optionally include components not shown in FIG. 1, and/or some components shown in FIG. 1 may be peripheral components that do not form part of or are not integrated into the computing system. The control module 110 may include one or more physical devices configured to execute one or more instructions. For example, the control module 110 may be configured to execute one or more instructions that are part of one or more programs, routines, objects, components, data structures, or other logical constructs. Such instructions may be implemented to perform a task, implement a data type, transform the state of one or more devices, or otherwise arrive at a desired result.

The control module 110 may include one or more processors and/or computing devices that are configured to execute software instructions, such as programmed using application software. In some embodiments, one or more algorithms as described herein are embedded into the PLC. Additionally or alternatively, the control module 110 may include one or more hardware or firmware logic machines configured to execute hardware or firmware instructions. The control module 110 may optionally include individual components that are distributed throughout two or more devices, which may be remotely located in some embodiments.

Thus, the various components, subsystems, or modules of the fluid fill system 100 may be implemented in hardware, software, or a combination thereof, as described in more detail herein. Additionally, the processes, methods, and/or algorithms described herein may be performed using one or more processors, processing machines or processing circuitry to implement one or more methods described herein.

FIG. 2 is a perspective view of the fill nozzle 102 showing a portion of the fluid fill sensor system 108 in accordance with an exemplary embodiment. FIG. 2 shows the fill nozzle 102 in an unblocking position. FIG. 3 is a perspective view of the fill nozzle 102 showing the fill nozzle 102 in a blocking position. FIG. 4 is a perspective view of the fill nozzle 102 showing the fill nozzle 102 in a seated position. The fill nozzle 102 is shown in an unseated position in FIGS. 2 and 3.

The fill nozzle 102 includes a body 130 attached to an end of a fluid line 132. Fluid is transferred to the fill nozzle 102 through the fluid line 132. The body 130 extends along a body axis 133.

The fill nozzle 102 includes a head 134 at an end of the fill nozzle 102 generally opposite the fluid line 132. The head 134 is configured to be at least partially received in the reservoir 104 of the vehicle component 106, such as into a fill port 136 of the reservoir 104. For example, a tip 138 of the head 134 is configured to be received in the fill port 136. FIG. 4 illustrates the fill nozzle received in the vehicle component 106. In an exemplary embodiment, the fill nozzle 102 includes a seal 139 at the tip 138 that seals to the fill port 136 when the tip 138 is loaded into the fill port 136.

The fill nozzle 102 includes an aperture 140 (FIG. 2) along an exterior surface thereof. Optionally, the aperture 140 may be in the head 134. Alternatively, the aperture may be in the body 130. The body 130 and/or head 134 includes an airflow passage 142 between an air hose 144 coupled to the fill nozzle 102 and the aperture 140. The air hose 144 supplies pressurized air to the fill nozzle 102. The pressurized air flows through the airflow passage 142 to the aperture 140. Even when the aperture 140 is unblocked (FIG. 2), the aperture 140 may still partially restrict the airflow from the airflow passage 142 such that the air in the fluid fill sensor system 108 is pressurized at a baseline pressure. For example, the air may be pressurized at approximately 2 psi. The sensor 112 monitors the pressure of the air in the fluid fill sensor system 108.

The fill nozzle 102 includes a collar 150 surrounding the head 134. The collar 150 is slidable along the body axis 133, such as vertically up and down the head 134. The collar 150 may be positioned near the tip 138. The collar 150 is movable between a blocking position (FIGS. 3 and 4) and an unblocking position (FIG. 2). In the blocking position, the collar 150 is aligned with the aperture 140 and at least partially blocks or restricts the airflow through the aperture 140. In an exemplary embodiment, the collar 150 is moved to the blocking position when the fill nozzle 102 is in the seated position (FIG. 4) and the collar 150 is moved to the unblocking position when the fill nozzle 102 is in the unseated position (FIG. 2). For example, as the fill nozzle 102 is loaded into the fill port 136 of the reservoir 104, the collar 150 engages the vehicle component 106 and is pushed upward relative to the head 134 to the blocking position (e.g., the tip 138 of the fill nozzle 102 continues to move downward into the reservoir 104 and the collar 150 is held in place on the vehicle component 106).

In an exemplary embodiment, the collar 150 is an annular ring having an upper edge 152 and a lower edge 154. The collar 150 extends circumferentially around the head 134. In the unblocking position, the upper edge 152 is positioned vertically below the aperture 140. When the fill nozzle 102 is seated, the lower edge 154 engages the vehicle component 106, such as when the fill nozzle 102 is loaded into the fill port 136. The collar 150 may be moved upward relative to the head 134 (e.g., the head 134 may continue to move downward into the vehicle component 106 while the collar 150 remains stationary or fixed relative to the vehicle component) until the upper edge 152 engages the body 130, such as a ledge defined by the body 130, which may correspond with the blocking position. In the blocking position, the upper edge 152 is positioned above the aperture 140 and the lower edge 154 is positioned below the aperture 140.

As the fill nozzle 102 is removed from the vehicle component 106, the collar 150 moves downward relative to the head 134 (e.g., the head 134 may be pulled out of the vehicle component 106 while the collar 150 remains stationary or fixed relative to the vehicle component) to the unblocking position. Gravity may force the collar 150 to move downward relative to the head 134. Optionally, a biasing mechanism, such as a spring, may be provided that biases the collar 150 to the unblocking position. In the unblocking position, the collar 150 is not aligned with the aperture 140, but rather is offset from the aperture 140, such as below the aperture 140. In the unblocking position, the air is able to flow through the aperture 140 unrestricted by the collar 150.

In the blocking position, when the airflow is impeded by the collar 150, the pressure of the air in the fluid fill sensor system 108, such as in the air hose 144, increases. For example, the air pressure may increase by approximately 5 psi from the baseline pressure. The fluid fill sensor system 108, such as using the sensor 112, monitors the increase of the air pressure and correlates the increase in air pressure with the collar 150 being in the blocking position and blocking the aperture 140. The blocking position corresponds to the fill nozzle 102 being positioned in the seated position. Thus, when the fluid fill sensor system 108 detects an increase in pressure, such increase in pressure corresponds to the fill nozzle 102 being positioned in the seated position and thus the fluid filling operation is able to begin. The control module 110 (shown in FIG. 1) may receive pressure signals from the sensor 112 and determine that the fill nozzle 102 is seated based on such pressure signals. For example, when a predetermined pressure increase (delta p) is sensed, then the control module 110 may determine that the fill nozzle 102 is in the seated position and ready for the filling operation to begin. Alternatively, when the control module 110 determines that the pressure is above a threshold pressure, then the control module 110 may determine that the fill nozzle 102 is in the seated position and ready for the filling operation to begin. The control module 110 may base the determination upon other factors or characteristics in alternative embodiments.

Optionally, when the fluid fill sensor system 108 detects a decrease in pressure, the control module 110 may cease the fluid filling operation. For example, such decrease in pressure may correspond to the fill nozzle 102 being moved from the seated position to the unseated position. The control module 110 may stop the filling operation if the fill nozzle 102 becomes unseated. As such, the fluid fill sensor system 108 may function as a shut-off detection system.

Figure 5:
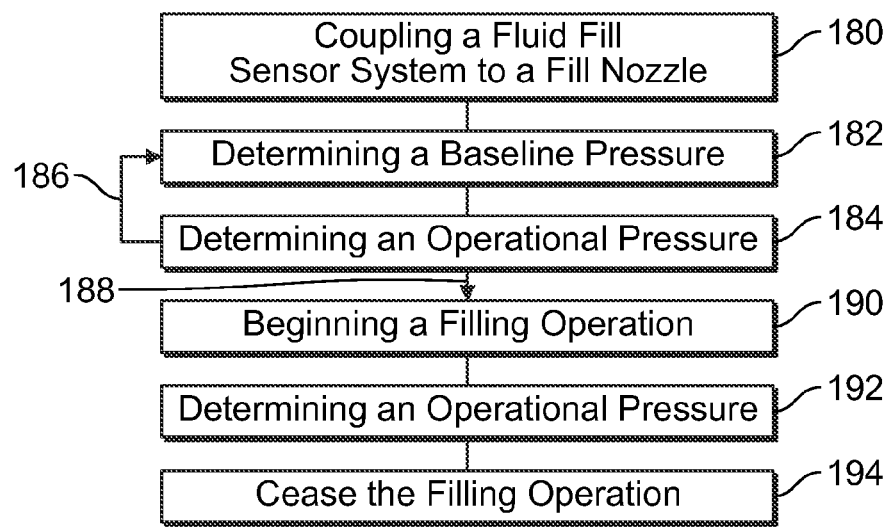
FIG. 5 illustrates a fluid filling method for the fluid fill system in accordance with an exemplary embodiment.

FIG. 5 illustrates a fluid filling method 170 in accordance with an exemplary embodiment. The method 170, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 170 may be able to be used as one or more algorithms to direct hardware to perform operations described herein.

The method 170 includes coupling 180 a fluid fill sensor system to a fill nozzle. The fluid fill sensor system may be a pneumatic sensor system having an air hose that is coupled to a body of the fill nozzle. The fill nozzle includes an aperture that allows the air to flow from the fill nozzle.

The method 170 includes determining 182 a baseline pressure of the fluid fill sensor system. The baseline pressure is determined when the aperture is unblocked. The baseline pressure may be determined using a sensor coupled to the air hose or other component of the fluid fill sensor system. The sensor may communicate with a control module of a fluid filling machine.

The method 170 includes determining 184 an operational pressure of the fluid fill sensor system. The operational pressure may be continuously monitored by the sensor. At 186, when the operational pressure is at the baseline pressure or is below a threshold pressure, the sensor continues to monitor the operational pressure. In such situation, the control module controlling the filling operation determines that the fill nozzle is unseated and therefore does not allow the filling operation to occur. At 188, when the sensor senses an increase in the pressure or senses a pressure above a threshold pressure, the control module controlling the filling operation determines that the fill nozzle is seated in the vehicle component and therefore allows the filling operation to occur. Therefore, the control module determines if the fill nozzle is in a seated position or in an unseated position based on the operational pressure of the fluid fill sensor system. In an exemplary embodiment, the operational pressure increases when the aperture in the fill nozzle is blocked. For example, when the collar around the fill nozzle is in the blocking position, the pressure in the air hose and other components of the fluid fill sensor system increases. However, when the collar is in the unblocking position, the aperture is unblocked and the pressure of the air in the fluid fill sensor system is at or near the baseline pressure.

The method 170 includes beginning 190 a filling operation, such as by delivering pressurized fluid to the fill nozzle. For example, a valve may be opened to begin the filling operation.

The method includes determining 192 an operational pressure of the fluid fill sensor system during the fluid filling operation. If the operational pressure remains elevated, such as above a threshold pressure, then the control module continues the filling operation because the fill nozzle remains in the seated position. If the sensor determines that a decrease in the operational pressure occurs or the operational pressure falls below a threshold pressure, then the control module ceases 194 the fluid filling operation because such decrease in pressure is associated with the fill nozzle moving to an unseated position.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, paragraph (f), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

The foregoing description of embodiments and examples has been presented for purposes of illustration and description. It is not intended to be exhaustive or limiting to the forms described. Numerous modifications are possible in light of the above teachings. Some of those modifications have been discussed and other will be understood by those skilled in the art. The embodiments were chosen and described for illustration of various embodiments. The scope is, or course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A fluid fill system comprising:
 a fill nozzle having a head and a collar movably coupled to the head, the head including an aperture and configured to be received in a reservoir of a vehicle component for filling the reservoir with a fluid, wherein the collar is selectively positionable in alignment with the aperture; and
 a fluid fill sensor system having an air hose coupled to the head and in fluid communication with the aperture, the fluid fill sensor system having a pressure sensor pneumatically sensing when the fill nozzle is properly seated with the vehicle component by sensing an increase in a pressure of the fluid fill sensor system when the collar is aligned with the aperture.

2. The fluid fill system of claim 1, wherein the collar at least partially blocks airflow from the fluid fill sensor system when the fill nozzle is properly seated with the vehicle component.

3. The fluid fill system of claim 2, wherein the collar is slidably coupled to the head and slides relative to the head between a blocking position and an unblocking position, the collar blocking the airflow in the blocking position, the collar not blocking the airflow in the unblocking position.

4. The fluid fill system of claim 2, wherein the collar is automatically moved to the blocking position by the vehicle component as the fill nozzle is seated with the vehicle component.

5. The fluid fill system of claim 2, wherein the collar at least partially blocks the aperture to increase the pressure in the fluid fill sensor system when the fill nozzle is properly seated with the vehicle component.

6. The fluid fill system of claim 1, wherein the pressure in the fluid fill sensor system increases when the aperture is blocked and the fill nozzle is properly seated with the vehicle component.

7. The fluid fill system of claim 1, wherein the fluid fill sensor system causes a fluid filling operation from the fill nozzle to cease when the pressure sensor senses a pressure drop.

8. A fluid fill system comprising:
 a fill nozzle having a head configured to be received in a reservoir of a vehicle component, the head being positionable in a seated position in the vehicle component in which fluid is capable of being dispensed into the reservoir, the head being positionable in an unseated position relative to the vehicle component in which fluid is unable to be dispensed into the reservoir, the head having an aperture positioned exterior of the vehicle component;
 a fluid fill sensor system configured to sense when the head is in the seated position and when the head is in the unseated position, the fluid fill sensor system having an air hose coupled to the head and in fluid communication with the aperture; and
 a collar movably coupled to the fill nozzle, the collar being movable between a blocking position and an unblocking position, in the blocking position, the collar is aligned with the aperture and blocks airflow through the aperture, in the unblocking position, the collar is not aligned with the aperture and air is able to flow through the aperture, the collar being moved to the blocking position when the fill nozzle is in the seated position, the collar being moved to the unblocking position when the fill nozzle is in the unseated position.

9. The fluid fill system of claim 8, wherein the collar slides along the head between the blocking position and the unblocking position.

10. The fluid fill system of claim 8, wherein the collar circumferentially surrounds the head.

11. The fluid fill system of claim 8, wherein the collar includes an upper edge and a lower edge, the lower edge being configured to engage the vehicle component as the head is received in the reservoir of the vehicle component.

12. The fluid fill system of claim 8, wherein the collar is pushed upward relative to the head as the head is lowered into the reservoir.

13. The fluid fill system of claim 8, wherein, in the blocking position, a pressure of the air in the fluid fill sensor system increases.

14. The fluid fill system of claim 8, wherein the fluid fill sensor system senses a pressure of the air in the fluid fill sensor system, the air having a baseline pressure when the air is able to freely flow out of the aperture, the pressure of the air in the fluid fill sensor system increasing when the airflow through the aperture is blocked.

15. The fluid fill system of claim 8, wherein the fluid fill sensor system senses a pressure of the air in the fluid fill sensor system, the fluid fill sensor system causing a fluid filling operation from the fill nozzle to cease when a pressure drop is sensed.

16. The fluid fill system of claim 8, wherein the fluid fill sensor system includes a pneumatic sensor sensing a pressure of the airflow in the fluid fill sensor system, the pneumatic sensor sensing an increase in pressure of the airflow in the fluid fill sensor system when the collar is moved to the blocking position.

17. The fluid fill system of claim 8, further comprising a control panel operably coupled to the fill nozzle to control dispensing of the fluid from the fill nozzle, the fluid fill sensing system being operably coupled to the control panel, wherein the control panel allows fluid flow from the fill nozzle when the collar is in the blocking position and the control panel restricts fluid flow from the fill nozzle when the collar is in the unblocking position.

18. The fluid fill system of claim 8, wherein the head includes an airflow passage between the air hose and the aperture.

19. The fluid fill system of claim 8, wherein the head includes a seal proximate to a tip of the head, the tip of the head being received in the reservoir of the vehicle component, the seal being configured to seal against the vehicle component when the head is positioned in the seated position.

20. A method of filling fluid in a vehicle component, the method comprising:
 providing a fill nozzle including a head and a collar movably coupled to the head, the head having an aperture, the collar selectively positionable in alignment with the aperture;
 coupling an air hose of a fluid fill sensor system to the head such that the air hose is in fluid communication with the aperture, wherein the collar is movable between a blocking position and an unblocking position, in the blocking position, the collar is aligned with the aperture and blocks airflow through the aperture, in the unblocking position, the collar is not aligned with the aperture and air is able to flow through the aperture, the collar being moved to the blocking position when the fill nozzle is in a seated position, the collar being moved to the unblocking position when the fill nozzle is in an unseated position;

determining a baseline pressure of the fluid fill sensor system;

determining an operational pressure of the fluid fill sensor system; and beginning a filling operation after the operational pressure increases from the baseline pressure.

21. The method of claim 20, further comprising determining an operational pressure of the fluid fill sensor system during the fluid filling operation and ceasing the filling operation after the operational pressure decreases.

22. The method of claim 20, further comprising:

moving the collar to the blocking position relative to the aperture, wherein the operational pressure of the air in the fluid fill sensor system increases when the collar is in the blocking position.

* * * * *